United States Patent [19]

Scaramucci

[11] 4,254,793
[45] Mar. 10, 1981

[54] BALL VALVE HAVING VALVE CHAMBER VENTING SEAL ASSEMBLIES

[76] Inventor: Domer Scaramucci, 3245 S. Hattie, Oklahoma City, Okla. 73129

[21] Appl. No.: 3,379

[22] Filed: Jan. 15, 1979

[51] Int. Cl.$^3$ .......................... F16K 5/00; F16K 25/00
[52] U.S. Cl. ................................. 137/246.22; 251/315; 251/172; 251/192; 277/29
[58] Field of Search ........................ 251/315, 172, 192; 137/246, 246.22; 277/29

[56] References Cited

U.S. PATENT DOCUMENTS

| | | | |
|---|---|---|---|
| 3,210,042 | 10/1965 | Freeman | 251/315 |
| 3,357,679 | 12/1967 | Gulick | 251/315 |
| 3,378,026 | 4/1968 | Oliver | 137/246.22 |
| 3,455,534 | 7/1969 | Scaramucci | 251/192 |
| 3,497,178 | 2/1970 | Priese | 251/315 |
| 3,508,736 | 4/1970 | Rhodes et al. | 251/315 |
| 3,667,727 | 6/1972 | Bowder | 251/172 |
| 3,752,178 | 8/1973 | Grove et al. | 137/246.22 |
| 4,116,208 | 9/1978 | Smith | 137/246.22 |

*Primary Examiner*—Martin P. Schwadron
*Assistant Examiner*—A. Michael Chambers

*Attorney, Agent, or Firm*—Dunlap, Codding & McCarthy

[57] ABSTRACT

A ball valve is disclosed wherein seal assemblies, extending about flow passages in the body of the valve to either side of a valve chamber containing the ball, are constructed to vent excess pressure in portions of the valve chamber cut off from the flow passages by the sealing of the seal assemblies to the ball and to the valve body without the need for backing the seal assemblies away from the ball. For this purpose, the seal between the valve body and each seal assembly is formed by an elastomeric biasing ring which is bonded on one side to the valve body or to other portions of the seal assembly and has an opposite, free side engaging the other of the valve body or other portions of the seal assembly. The biasing ring is positioned on a side of the seal assembly opposite the ball and fluid pressure in the cut off portion of the valve chamber is transmitted about the seal assembly to the free side of the biasing ring for venting thereacross into a flow passage. The biasing ring is axially compressed between the valve body and other portions of the seal assembly to urge the other portions of the seal assembly against the ball.

21 Claims, 15 Drawing Figures

BALL VALVE HAVING VALVE CHAMBER VENTING SEAL ASSEMBLIES

BACKGROUND OF THE INVENTION

1. Field of the Invention

This invention relates generally to improvements in valves and, more particularly, but not by way of limitation, to improvements in ball valves.

2. Discussion of the Prior Art

An ever present danger in many industrial plants is the possibility that a fire may break out in the plant. While appropriate preventive measures are a normal part of plant operations, fires nevertheless occur with a frequency such that, where possible, it is desirable to construct mechanical devices utilized to carry out the activities for which the plant is established to limit the damage which might be occasioned by a fire. In particular, valves and conduits used to transport fluid about the plant are constructed with fire safety in mind.

The problems associated with the exposure of valves to fire can take several forms. Thus, for example, seals formed of organic materials can be destroyed so that the valve loses the capacity to obstuct fluid flow through a conduit wherein the valve is disposed. When the valve is disposed in a coduit which transports a flammable fluid and where the conduit leads to the source of fire, the failure of the valve can result in a continuous feeding of the flames so that it can be very difficult to bring the fire under control. A valve which is designed to close despite destruction of organic seals is disclosed in the applicant's co-pending United States Patent Application entitled "Fire Safe Disc Valve", Ser. No. 865,853, filed Dec. 3, 1977.

Seals need not be destroyed for the hazards of fire to be exacerbated by the effect of fire on a valve. A common valve construction includes a body having a valve chamber which contains a rotatable valve member and which includes annular seal assemblies encircling passages leading to the valve chamber and mating with the body and the valve member to disrupt fluid flow through the valve when the valve member is rotated to a preselected position. The seal assemblies form seals with the body and with the valve member so that the valve member blocks each passage into the valve chamber. While such construction provides an effective mode of valve closure, it also results in the formation of a trapped fluid chamber, forming a portion of the valve chamber, about the valve member. That is, when the valve is closed, the seal assemblies isolate a portion of the valve chamber between the seal assemblies from the passages leading to the valve chamber. If such a valve is subjected to heat, both the body of the valve and fluid in the trapped fluid chamber will expand. Where the rate of expansion of the fluid with temperature exceeds the rate of expansion of the body, the valve body is subjected to large internal pressures. In extreme cases, such pressures can be sufficient to cause a rupture of the body of the valve. The damage caused by such reupture can, in many situations, not be limited to the destruction of the valve. Where the heating of the valve is caused by a fire and where the fluid is flammable, such a rupture will have the effect of adding a new source of combustible material to the fire, and, in some cases, of spreading the fire.

It is common practice to provide the valve chamber of such valves with pressure relief means to prevent rupture via heating of the valve. In particular, it is conventional to construct valves such that a high pressure in portions of the valve chamber between seal assemblies will cause one or both of the seal assemblies to displace away from the valve member to vent such pressure into one or both of the passages leading to the valve chamber.

This conventional mode of providing pressure relief to isolated portions of a valve chamber is subject to an important limitation. If, for some reason, the seal assemblies should bind in the body of the valve, the pressure relieving features of the valve become inoperative and heating of the valve can result in the above-described problem despite the presence of the relief features. Unfortunately, a number of factors, acting singly or in combination, can cause the seal assemblies to bind. In particular, a seal assembly will generally be supported on an annular surface formed about the passage encircled by the assembly and forming a bearing surface for the seal assembly. The periphery of the seal assembly forms a mating bearing surface so that axial movement of the seal assembly occurs by sliding of the periphery of the seal assembly along the annular surface formed about the passage to support the seal assembly. These surfaces are subject to corrosion which can bind the seal assemblies. Moreover, foreign matter can become lodged between these surfaces to bind the seal assembly and the seal assemblies and/or body can become distorted to produce binding.

SUMMARY OF THE INVENTION

The present invention contemplates a valve wherein pressure relief for the trapped fluid chamber about the valve member is provided without the need for displacement of seal assemblies away from the valve member. In particular, the seal assemblies include seal support rings extending about passages in the valve chamber and having sealing rings bonded to the forward sides thereof facing the valve member to form seals between the seal assemblies and the valve member. The seal assemblies include biasing rings, disposed at rear sides thereof and formed of an elastomeric material, to urge the sealing rings against the valve member in a manner similar to the manner in which pusher pads are utilized in the applicant's U.S. Pat. No. 3,455,534 issued July 15, 1969. In the present invention, one side of the biasing ring is bonded to one of the seal support ring or the body of the valve and the other side of the biasing ring engages, but is not bonded to the other of the seal support ring and body of the valve. A portion of the seal support ring or body of the valve to which the biasing ring is bonded extends about the biasing ring and supports the outer periphery thereof such that a unidirectional sealing capability is formed along the unbonded, or free, side of the biasing ring. Specifically, an excess fluid pressure at the inner periphery of the biasing ring will wedge the free end thereof more tightly against the seal support ring or body of the valve engaged thereby while an excess fluid pressure at the outer periphery of the sealing ring, adjacent the free end thereof, will be vented across the free end. Means are provided to transmit fluid pressure from the trapped fluid chamber about the seal support ring to portions of the outer periphery of the biasing ring adjacent the free end thereof such that excess fluid pressure in the trapped fluid chamber is vented across the free end of the biasing ring.

An object of the present invention is to provide pressure relief for portions of a valve chamber between seal assemblies which coact with a valve member disposed in the valve chamber to close a valve.

Another object of the invention is to eliminate the necessity for seal assembly displacement in achieving pressure relief for isolated portions of a valve chamber.

Another object of the invention is to achieve pressure relief for isolated portions of a valve chamber via seal assemblies which are of simple and economical construction.

Other objects and advantages of the invention will be evident from the following detailed description when read in conjunction with the accompanying drawings which illustrate various embodiments of the invention.

DESCRIPTION OF THE PREFERRED EMBODIMENTS

Figure 1:
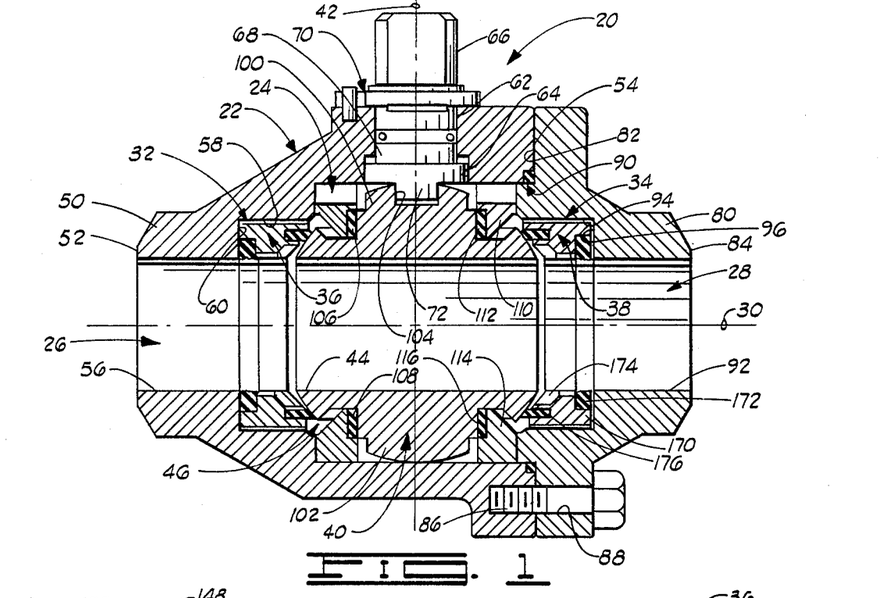
FIG. 1 is a cross-section in side elevation of a valve constructed in accordance with the present invention.

Referring now to the drawings in general and to FIG. 1 in particular, shown therein and designated by the general reference numeral 20 is a valve constructed in accordance with the present invention. The valve 20 includes a body 22 having formed therein a centrally disposed valve chamber 24 and first and second passages, 26 and 28 respectively, forming inlet and outlet passages for the valve 20 and communicating with opposite sides of the valve chamber 24 and extending to the exterior of the body 22 to form a flow passageway through the body 22 about a longitudinal flow axis 30. First and second seal pockets, 32 and 34 are formed about the first passage 26 and the second passage 28 respectively and the first and second seal pockets, 32 and 34 respectively, contain, respectively, annular first and second seal assemblies, 36 and 38 respectively. A valve member 40 is mounted within the valve chamber 24 for rotation about a transverse trunnion axis 42 between an open position shown in FIG. 1 and a closed position (not shown) wherein the valve member is rotated substantially 90° from the open position about the axis 42. The valve member 40 has a central bore 44 which aligns with the passages 26, 28 in the open position of the valve member 40 to permit the passage of fluid through the valve 20 in the usual manner when the valve member 40 is in the open position thereof. In the closed position of the valve member 40, the seal assemblies 36, 38 engage the exterior surface of the valve member 40 and portions of the body 22 forming the seal pockets 32 and 34 respectively so that the valve member 40 disrupts fluid communication between each of the passages 26, 28 and the valve chamber 24 in the usual manner to prevent fluid flow through the valve 10. As will be clear to those skilled in the art, the disruption of fluid flow via the valve member 40 and the seal assemblies 36, 38 disposed in pockets 32, 34 adjacent the valve chamber 24 and on opposite sides thereof results in the formation of a trapped fluid chamber 46 between the seal assemblies 36 and 38. That is, a portion of the valve chamber 24 extending about the valve member 40 is isolated from the passages 26, 28 via the engagement between the seal assemblies 36, 38 and the valve member 40.

The body 22 can be conveniently fabricated in two portions which are bolted together as has been shown in FIG. 1. In particular, the body comprises a first portion 50 having a first end 52 and an opposite second end 54. A bore 56 intersects the first end 52 and the second end 54 and extends therebetween to form the first passage 26, the first seal pocket 32 and the valve chamber 24. In particular, portions of the bore 56 adjacent the first end 52 are formed on a relatively small diameter to form the first passage 26; an intermediate portion of the bore 56 is formed on an intermediate diameter to form the first seal pocket 32 and portions of the bore 56 extending from the first seal pocket 32 to the second end 54 of the first portion 50 of the body 22 are formed on a relatively large diameter to form the valve chamber 24. It will be noted that such construction forms the first seal pocket via a cylindrical pocket periphery 58 which extends circumaxially about the flow axis 30 of the body 22 and an annular, radially extending pocket wall 60 intersecting the pocket periphery 58 and similarly extending circumaxially about the axis 30.

A transverse operating stem bore 62 is formed through the wall of the body 22 near the center of the portion of the bore 56 forming the valve chamber 24 and the axis of the operating stem bore 62 defines the trunnion axis 42. A portion 64 of the operating stem bore 62 intersecting the bore 56 is formed on an enlarged diameter and a generally circular operating stem 66, inserted through the operating stem bore 62 from the valve chamber 24, has an enlarged lower portion 68 which mates with the enlarged portion 64 of the operating stem bore 62. Retaining means 70 mounted on the operating stem 66 and engaging the outer periphery of the body 22 cooperates with the disposition of the enlarged portion 68 of the operating stem 66 in the enlarged portion 64 of the operating stem bore 62 to retain the operating stem 66 in the operating stem bore 62 as is known in the art. Accordingly, the operating stem 66 is mounted within the operating stem bore 62 for rotation about the trunnion axis 42. A key 72 is formed on the end of the operating stem 66 disposed within the body 22 and extends diametrically across such end of the operating stem 66 and into the valve chamber 24 for a purpose to be described below.

The body 22 further includes a circular second portion 80 having a first end 82 and an opposite second end 84. The valve body 22 is assembled by abutting the first end 82 of the second portion 80 of the body 22 against the second end 54 of the first portion 50, positioning the second portion 80 coaxially with the flow axis 30, and bolting the second portion 80 to the first portion 50 via bolt holes 86 and 88 formed in the first portion 50 and the second portion 80 respectively for such purpose. It is convenient to form an annular shoulder 90 on the first end 82 of the second portion 80 of the body 22 such that a portion of the second portion 80 of the body 22 is insertable into the bore 56 formed through the first portion 50 of the body 22 for coaxially aligning the second portion 80 with the flow axis 30.

The second passage 28 and the second seal pocket 34 are formed in the second portion 80 of the body 22 in the same manner that the first passage 26 and the first seal pocket 32 are formed in a first portion 50 thereof. That is, a bore 92 is formed through the second portion 80 of the body 22, the bore 92 intersecting the first end 82 and the second end 84 and extending therebetween. Portions of the bore 92 adjacent the second end 84 of the second portion 80 are formed on a relatively small diameter to form the first passage 28 and portions of the bore 92 adjacent the first end 82 of the portion 80 are formed on a relatively larger diameter to form the second seal pocket 34. As is the case with the first seal pocket 32, the second seal pocket 34 is defined by a cylindrical pocket periphery 94 extending circumaxially about the flow axis 30 and an annular pocket wall 96 extending radially between the second passage 28 and the cylindrical pocket periphery 94.

The valve member 40 has the general form of a spherical ball with the central bore 44 formed therethrough extending circumaxially about a diameter thereof. Portions of the generally spherical surface of the valve member 40 are cut away to form a circular first trunnion 100 and a circular second trunnion 102 diametrically opposed to the first trunnion 100 and coaxial therewith. The common axis of the first trunnion 100 and the second trunnion 102 is disposed along a diameter of the valve member 40 which is perpendicular to the diameter about which the bore 44 through the valve member 40 is disposed. A central slot 104 is formed in the distal end of the first trunnion 100 and is oriented along a line normal to the plane defined by the axis of the bore 44 and the common axis of the trunnions 100, 102. The slot 104 engages the key 72 on the end of the operating stem 66 so that the valve member 40 can be rotated about the trunnion axis 42 by means of rotating the operating stem 66.

A first trunnion bushing 106, formed of a heat destructible organic polymer, is mounted on the first trunnion 100 and extends thereabout. A similar second trunnion bushing 108 is similarly mounted on the second trunnion 102. The valve 20 comprises a first trunnion mount 110 having a bore 112 formed therethrough and sized to engage the outer periphery of the first trunnion bushing 106. The first trunnion mount extends longitudinally across the valve chamber 24 and engages portions of the body 22 defining the valve chamber 24 to longitudinally position the valve member within the valve chamber 24. Similarly, a second trunnion mount 114, having a bore 116 sized to mate with the second trunnion bushing 108 is disposed about the second trunnion bushing 108 and extends across the valve chamber 24 to longitudinally position the second trunnion 102 within the valve chamber 24.

In the preferred embodiments of the present invention, the second seal assembly 38 is identical to the first seal assembly 36 and is positioned in the second seal pocket 34 in the same manner that the first seal assembly 36 is positioned in the first seal pocket 32. Accordingly, it will not be necessary to describe the construction and positioning of both seal assemblies 36, 38. Rather, it will suffice to describe the construction and positioning of the first seal assembly 36 for purposes of the present disclosure.

Figure 2:
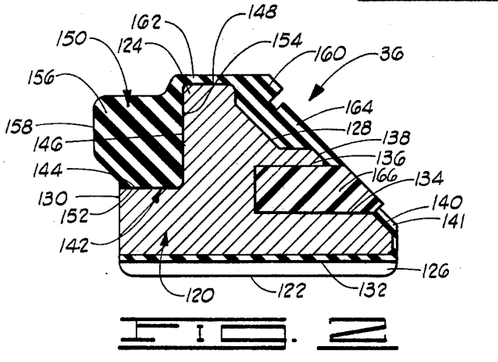
FIG. 2 is an enlarged typical cross-sectional view through a seal assembly used in the valve of FIG. 1.
Figure 3:
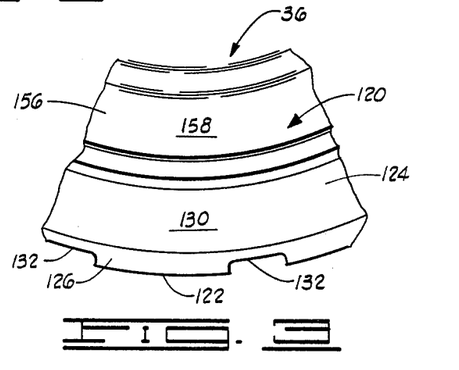
FIG. 3 is a fragmentary rear elevational view of the seal assembly of FIG. 2.

The construction of the first seal assembly 36 is more particularly shown in FIGS. 2 through 5 for one preferred embodiment thereof. Referring to FIG. 2, wherein is shown a typical cross-section of the first seal assembly 36, the first seal assembly 36 comprises an annular first seal support ring, generally designated 120, having an outer periphery 122 which engages the cylindrical pocket periphery 58 of the first seal pocket 32 in the assembled valve 20. In a preferred form, the first seal support ring 120 comprises an inner portion 124, formed of a metal such as steel or the like, and an outer portion 126, which is formed of a flexible elastomeric material such as rubber or the like. The first seal support ring 120 has a forward side 128 which has a generally frusto-conical configuration and which faces the valve member 40 in the assembled valve 20. The first seal support ring 120 has a rear side 130 opposite the forward side 128 and facing the pocket wall 60 of the first seal pocket 32 in the assembled valve 20. A plurality of grooves 132 are formed in the outer periphery 122 of the first seal support ring in the outer portion 126 thereof and the grooves 132 extend from the forward side 128 of the first seal support ring 120 to the rear side 130 thereof to transmit fluid pressure in the trapped fluid chamber 46 to the pocket wall 60 and rear side 130 of the first seal support ring 120 in the assembled valve 20.

Figure 4:
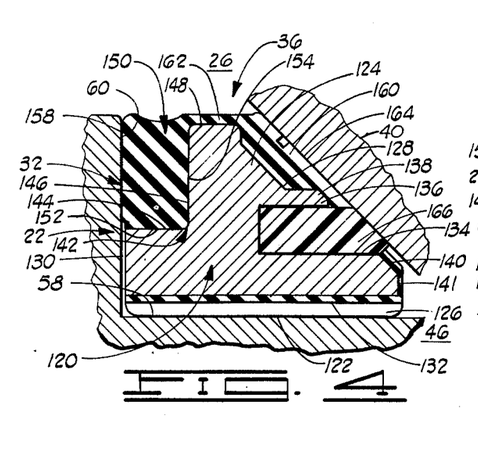
FIG. 4 is an enlarged typical cross-sectional view through the seal assembly of FIG. 2 showing the configuration of the seal assembly when installed in the valve of FIG. 1.
Figure 5:
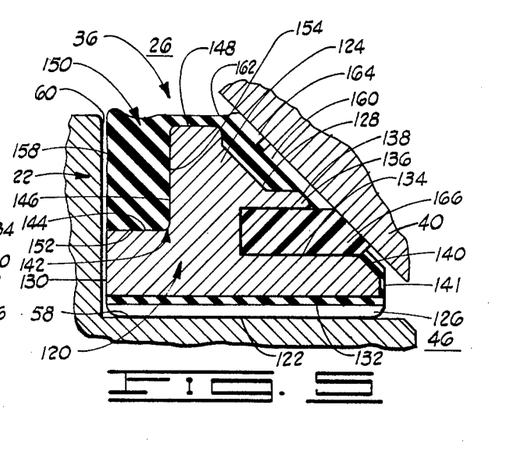
FIG. 5 is a cross-sectional view similar to FIG. 4 showing the manner in which the seal assembly vents excess pressure from isolated portions of the valve chamber of the valve of FIG. 1.

An annular thrust ring groove 134 is formed in the inner portion 124 of the first seal support ring 120, the thrust ring groove 134 intersecting a medial portion of the forward side 128 of the first seal support ring 120 and extending axially therefrom a preselected distance into the inner portion 124 of the first seal support ring 120 toward the rear side 130 thereof. Portions of the inner portion 124 of the first seal support ring 120 adjacent the thrust ring groove 134 and disposed radially inwardly thereof are configured to form an axially extending annular lip 136 having a relatively narrow radial width. An annular surface 138 is formed on the distal end of the lip 136 and the surface 138 is constructed to conform to a portion of a sphere having a radius equal to the radius of the valve member 40. The axial length of the lip 136 is selected such that, when the common axis of the first trunnion 100 and second trunnion 102 of the valve member 40 is disposed along the trunnion axis 42 and when the rear side 130 of the first seal support ring 120 abuts the pocket wall 60 of the first seal pocket 32, the surface 138 will be displaced from the surface of the valve member 40 a distance less than the common radial width of the first bushing 106 and the second bushing 108. Radially outwardly of the thrust ring groove 134 the inner portion 124 of the first seal support ring 120 has formed thereon a surface 140 shaped to conform to a portion of spherical surface having a diameter which is equal to the diameter of the valve member 40. The surface 140 is axially positioned such that, when the common axis of the trunnions 100, 102 is disposed along the trunnion axis 42 and when the rear side 130 of the first seal support ring 120 abuts the pocket wall 60, the surface 140 is displaced from the surface of the valve member 40 a distance less than the radial width of the trunnion bushing 106 and 108 but greater than the spacing between the surface 138 on the lip 136 from the surface of the valve member 40. Portions of the inner portion 124 whereon the surface 140 is formed are radially thicker than the lip 136 for a purpose to be described below. A portion 141 of the outer portion 126 can be extended over the surface 140 as shown in FIGS. 2, 4 and 5 and bonded thereto to help secure the outer portion 126 of the first seal support ring 120 to the inner portion 124 thereof.

An annular shoulder 142 is formed in the inner portion 124 of the first seal support ring 120, the shoulder 142 being defined by a cylindrical outer periphery 144 extending circumaxially about the first passage 26 and a radial wall 146 intersecting the outer periphery 144 and extending therefrom radially inwardly to the inner periphery 148 of the first seal support ring 120.

The first seal assembly 36 further comprises an annular first biasing ring 150 constructed of an elastomeric material, such as rubber, and generally disposed in the shoulder 142 formed in the rear side 130 of the first seal support ring 120. That is, the first biasing ring has an outer periphery 152 bonded to the outer periphery 144 of the shoulder 142 and a fixed end 154 bonded to the raidal wall 146 of the shoulder 142. Opposite the fixed end 154 the first biasing ring 150 has an axially extending annular ear 156 which terminates in a free end 158. In a relaxed state of the first biasing ring 150, such as will occur when the first biasing ring 150 is removed from the body 22, the ear 156 projects outwardly from the rear side 130 of the seal support ring 120 such that the free end 158 is axially displaced from the rear end 130 of the first seal support ring 120 in a direction opposed to the direction from the rear side 130 of the first seal support ring 120 to the forward side 128 thereof. When the first seal assembly 36 is mounted in the first seal pocket 32, the free end 158 of the first biasing ring 150 engages the pocket wall 60 and, as will be discussed below, the first biasing ring 150 is placed in a state of compressive stress to urge the first seal assembly 36 toward the valve member 40. The configuration of the first biasing ring 150 in such compressively stressed state has been generally indicated in FIG. 4.

A first sealing ring 160, formed of a flexible elastomeric material such as rubber and having a generally frusto-conical shape, is bonded to the forward side 128 of the first seal support ring 120 and extends circumferentially about the first passage 26 in engagement with the valve member 40. Specifically, the first sealing ring 160 is bonded to portions of the inner portion 124 of the first seal support ring 120 adjacent the first passage 26 and the first sealing ring 160 extends from the inner periphery 148 of the first seal support ring 120 to the first thrust ring groove 134 and overlays the annular lip 136 formed adjacent the first thrust ring groove 134. In one preferred embodiment of the present invention, the first sealing ring 160 is formed unitarily with the first biasing ring 150 such that a bridge 162 of elastomeric material extends along the inner periphery 148 of the first seal support ring 120.

As is well known in the art, an elastomeric substance such as rubber will provide a tight fluid seal with the surface of a valve member such as the valve member 40 but is subject to rapid and excessive wear and tearing should thrust forces exerted thereon by the valve member become excessive. In order to obtain the sealing characteristics of the elastomeric composition of the first sealing ring 160 against the relatively rigid surface provided by the valve member 40 without subjecting the first sealing ring 160 to excessive axial thrust, the first seal assembly 36 further comprises a first thrust ring 166 disposed in the first thrust ring groove 134. The first thrust ring 166 is constructed of a relatively inflexible organic polymer, such a polytetrafluoroethylene, and extends a preselected distance from the first thrust ring groove 134 to engage the surface of the valve member 40 and, thereby, to limit thrust forces exerted by the valve member 40 on the first sealing ring 160.

As has been previously noted the second seal assembly 38 is identical to the first seal assembly 36. That is, as indicated in FIG. 1, the second seal assembly generally comprises a second seal support ring 170 (for clarity of illustration, the two-part construction of the seal support rings 120, 170 have not been shown in FIG. 1); a second biasing ring 172; a second sealing ring 174; and a second thrust ring 176.

FIGS. 4 through 7 have been included to show various modes of operation of the seal assemblies 36 and 38 under different conditions of operation of the valve 20. Initially, it will be noted that an excess fluid pressure in the trapped fluid chamber 46 will generally be vented across the free end 158 of the first biasing ring 150 or the free end (not numerically designated in the Figures) of the second biasing ring 172 for reasons which will become clear below.

The axial width of the first seal support ring 120 and the axial extent of the first seal pocket 32 are selected such that, when the first thrust ring 166 engages the valve member 40 in the normal operating position of the valve member 40 wherein the trunnions 100, 102 are centered on the trunnion axis 42, the rear side 130 of the seal support ring 120 will be in a nearly abutting relation with the pocket wall 60 of the first seal pocket 32 as shown in FIGS. 4 and 5. Moreover, as shown in FIG. 2, the ear 156 of the first biasing ring 150 extends, in a relaxed state thereof, a considerably larger distance axially outwardly from the rear side 130 of the first seal support ring 120 than the separation thereof from the pocket wall 60. Accordingly, as shown in FIG. 4, when fluid pressure in the first passage 26 is greater than or equal to pressure in the trapped fluid chamber 46, the free end 158 of the first biasing ring 150 will engage the pocket wall 60 and be compressively stressed thereby such that portions of the first biasing ring 150 are distorted radially inwardly. The compression of the first biasing ring 150, in coaction with fluid pressure on the inner periphery thrust and in coaction with the radial support of the outer periphery 152 thereof by the outer periphery 144 of the shoulder 142 of the first seal support ring 120, urges the free end 158 of the first biasing ring 150 tightly against the pocket wall 60 to provide a fluid seal separating the first passage 26 from the pocket periphery 58 of the first seal pocket 32. Thus, although the pocket periphery 58 is in fluid communication with the trapped fluid chamber 46 via the grooves 132 in the outer portion 126 of the first seal support ring 120, the first thrust ring 150 prevents leakage between the first passage 26 and the trapped fluid chamber 46.

Moreover, the compressive stress of the first biasing ring 150 urges the first seal assembly 36 toward the valve member 40 so that the first sealing ring 160 engages the valve member 40 and forms a seal between the first passage 26 and the trapped fluid chamber 46 at the forward side 128 of the first seal support ring 120. Thus, under normal operating conditions, the valve 20 is closed in the normal manner by positioning the valve member 40 in the closed position thereof. The valve member 40 presents an uninterrupted surface to the first passage 26 and the first seal assembly 36 provides a seal between this uninterrupted surface and portions of the body 22 defining the first passage 26. That is, the first passage 26 is closed off within the body 22 of the valve 20 when the valve member 40 is placed in the closed position thereof. As will be clear to those skilled in the art, a similar closing off of the second passage 28 occurs when fluid pressure is exerted tending to force fluid from the second passage 28 toward the first passage 26.

FIG. 5 shows the operation of the first seal assembly 36 should the pressure in the trapped fluid chamber 40 become greater than the fluid pressure in the first passage 26, as for example should the valve 20 be exposed to fire resulting in unequal expansion of fluid trapped within the trapped fluid chamber 46 and the body 22 of the valve 20. The pressure in the trapped fluid chamber 46 is transmitted to the ear 156 of the first biasing ring 150 along the pocket periphery 58 and pocket wall 60 and the fluid pressure in the first passage 26 is exerted against the inner periphery of the first biasing ring 150. An asymmetry in the operation of the first seal assembly in response to the direction of pressure exerted radially thereacross is provided by the support of the outer periphery 152 of the first biasing ring 150 via the outer periphery 144 of the shoulder 142 in the rear side 130 of the first seal support ring 120 and the lack of a corresponding radial support for the inner periphery of the first biasing ring 150. In response to an excess pressure at the outer periphery of the ear 156, the first biasing ring 150 is further compressibly stressed to lift the free end 158 formed on the ear 156 away from the pocket wall 60 such that excess pressure within the trapped fluid chamber 46 is vented across the free end 158. Thus, in the event valve 20 is exposed to moderate heating by a fire insufficient in intensity to result in destruction of the first biasing ring 150, the first sealing ring 160 and the first thrust ring 166, such that excess pressure builds up within the trapped fluid chamber 46, such excess fluid pressure is vented across the free end 158 of the first biasing ring 150 or the free end (not numerically designated in the drawings) of the second biasing ring 172. It will also be noted that a similar venting action can occur in the absence of a pressure build-up in the trapped fluid chamber 46, on the downstream side of the valve 20 such that, as has been previously noted, the fluid pressure in the trapped fluid chamber 46 tends to remain at a value substantially equal to fluid pressure on the downstream side of the valve 20.

The two-part construction of the seal support rings 120, 170 provide an effective manner of insuring that the above-described operation of the valve 20 will occur despite possible corrosion of the body 22 and/or the seal support rings 120, 170 and despite the possible deposition of foreign particulate matter about the seal assemblies 36, 38. Specifically, the flexibility of the outer portion 126 of the first seal support ring 120 and the outer portion (not shown) of the second seal support ring 170 insure that the seal assemblies 36, 38 will not bind to disrupt normal sealing between the sealing rings 160, 174 and further insure the transmission of fluid pressure along the pocket peripheries 58, 94 by providing a resilient engagement between the seal support rings 36, 38 and any corrosion or foreign particulate matter which might exist at the pocket peripheries 58, 94. That is, the outer portion 126 of the first seal support ring 120 and the outer portion (not shown) of the second seal support ring 170 can distort to provide fluid pressure transmission along the pocket peripheries 58, 94. A further advantage is that the outer portions of the seal support rings 120, 170 protect adjacent metal parts of the valve 20 against corrosion.

Figure 6:
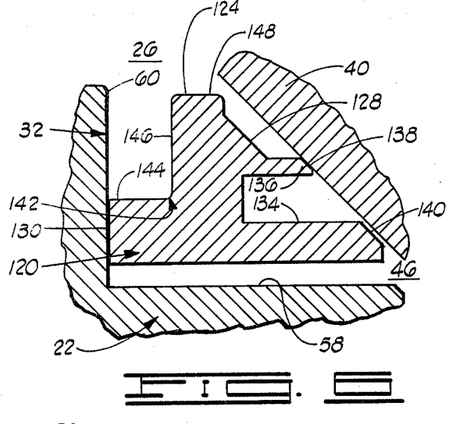
FIG. 6 is a cross-sectional view similar to FIG. 4 showing one mode of sealing the valve of FIG. 1 in the event organic seals are destroyed by fire.
Figure 7:
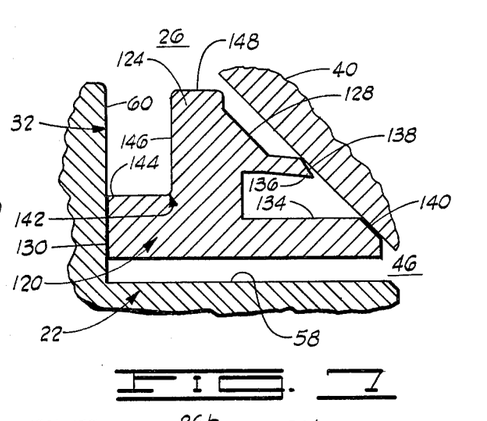
FIG. 7 is a cross-sectional view similar to FIG. 6 showing a second mode of sealing the valve in the event organic seals are destroyed by fire.

FIGS. 6 and 7 have been included to show the operation of the valve 20 for two conditions of fluid pressure thereacross in the case wherein the first biasing ring 150, the first sealing ring 160 and the first thrust ring 166 have been destroyed by subjection of the valve 20 to a fire. By way of example, FIGS. 6 and 7 have been drawn for the case wherein the firsst passage 26 is on the downstream side of the valve 20. That is, FIGS. 6 and 7 contemplate that a higher fluid pressure exists in the second passage 28 than in the first passage 26. As has been previously noted, the trunnion bushings 106 and 108 are constructed of a fire destructible organic polymer such that the destruction of the first biasing ring 150, the first sealing ring 160 and the first thrust ring 166 will be accompanied with the destruction of the trunnion bushings 106 and 108. As is known in the art, a variety of organic polymers are available for construction of the bushings 106, 108 and the rings 150, 160 and 166 so that the materials selected for these components can be selected to insure the destruction of the bushings 106, 108 when the rings 150, 160 and 166 are destroyed by fire.

As has been previously noted the slot formed in the first trunnion 100 is disposed along a line substantially perpendicular to the plane formed by the flow axis 30 and the trunnion axis 42 so that, in the closed position of the valve member 40, the slot 104 parallels the flow axis 30. Thus, should the bushings 106 and 108 be destroyed by fire with the valve member 40 in the closed position and with the second passage 28 being upstream of the first passage 26, excess fluid pressure in the second passage 28 will force the valve member 40 toward the first passage 26 of the body 22. However, as has been previously noted, the radial width of the bushings 106, 108 is greater than the spacing from the surface 138 on the distal end of the annular lip 136 formed on the forward side 128 of the first seal support ring 120 to the surface of the valve body 40 when the rear side 130 of the first seal support ring 120 abuts the pocket wall 60. Accordingly, the valve member 40 will move toward the first passage 26 in response to the pressure in the second passage 28 until the surface of the valve member 28 engages the surface 138 on the lip 136 and the rear side 130 of the first seal support ring 120 engages the pocket wall 60. Should the pressure differential between the first passage 26 and the second passage 38 be moderate, the lip 136 will suffer relatively little distortion, as has been illustrated in FIG. 6, and metal-to-metal seals will be formed between the surface 138 of the annular lip 136 and the surface of the valve member 40 and between the rear face 130 of the first seal support ring 120 and the pocket wall 60 such that little or no fluid flow occurs through the valve 20. Should the pressure differential between the first passage 26 and the second passage 28 be larger, such that a tendency for increased leakage between the annular lip 136 and the valve member 40 occurs, the relatively thin radial thickness of the annular lip 136 provides the annular lip 36 with a spring quality which permits portions thereof to open about the surface of the valve member 40 and be pressed thereagainst via the spring quality so provided to the annular lip 136. In such case, the valve member 40 will move into an engaging relation with the surface 140 formed on the forward side 128 of the first seal support ring radially outwardly of the first thrust ring groove 134 and the distal end of the lip 136 will bell out around the surface of the valve member 40 to provide a tighter metal-to-metal seal between the first seal support ring 120 and the valve member 40 than would be achieved in the case of a smaller pressure differential between the first passage 26 and the second passage 28.

Figure 8:
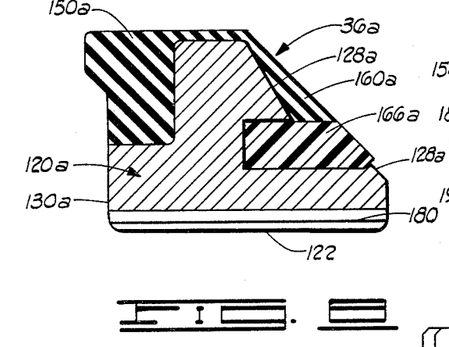
FIG. 8 is an enlarged typical cross-sectional view similar to FIG. 4 of a second embodiment of a seal assembly used in the valve of FIG. 1.

Referring now to FIG. 8, shown therein is a typical cross section of a second embodiment of the first seal assembly, designated 36a, suitable for use in the body 22 of a valve constructed in accordance with the present invention. It will be clear to those skilled in the art that the second seal assembly can similarly be constructed in the manner of the first seal assembly 36a rather than in the manner of the first seal assembly 36. As in the case of the first seal assembly 36, the modified first seal assembly 36a generally comprises a first seal support ring 120a upon which are mounted a first biasing ring 150a, a first sealing ring 160a and a first thrust ring 166a positioned on the first seal support ring 36a in the same manner as for the seal support ring 36 and having the same general configurations as the first biasing ring 150, the first sealing ring 160 and the first thrust ring 166. As shown in FIG. 8, minor changes in these configurations can be effected for specialization of the valve to differing applications. The significant difference between the first seal support ring 120 and the first seal support ring 120a is that the first seal support ring 120a is of one-part construction rather than of two-part construction as is the case with the first seal support ring 120. In order to provide enhanced venting of fluid from the trapped fluid chamber to the rear side 130a of the first seal support ring 120a, a plurality of vent passages 180 are formed through the first seal support ring 120a, the vent passages 180 intersecting portions of the forward side 128a of the first seal support ring 120a near the outer periphery 122 thereof and the vent passages 180 intersecting the rear side 130a of the first seal support ring 120a and the vent passages 180 extending between the forward side 128a and the rear side 130a to transmit fluid pressure from the trapped fluid chamber 46 (not shown in FIG. 8) to the pocket wall 60 (not shown in FIG. 8). It will also be noted that the annular lip 136 formed about the inner periphery of the first thrust ring 166 and on the forward side 128 of the first seal support ring 120 can be omitted for the first seal support ring 120a.

Figure 9:
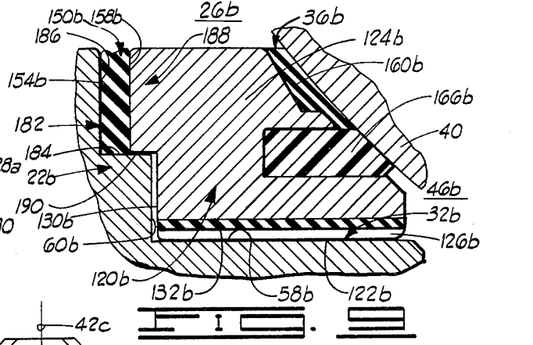
FIG. 9 is an enlarged typical cross-sectional view through a seal assembly and surrounding portions of a valve showing yet a third embodiment of a seal assembly used in a valve constructed in accordance with the present invention.

FIG. 9 illustrates a typical cross-section of another embodiment of the first seal assembly, designated 36b, and a corresponding modification of the body, designated 22b, of a valve constructed in accordance with the present invention. In particular, the body 22b differs from the body 22 in that an annular shoulder 182 is formed in the pocket wall 60b of the first seal pocket 32b. The shoulder 182 is defined by a cylindrical outer periphery 184 which extends circumaxially about the flow axis 30 and an annular face 186 perpendicularly intersecting the periphery 184 and extending therefrom to the flow passage 26b. The first seal assembly 36b comprises a first seal support ring 120b, a first biasing ring 150b, a first sealing ring 160b and a first thrust ring 166b positioned in substantially the same manner as in the first seal assembly 36 and the first seal assembly 36a. As in the case of the first seal support ring 120, the first seal support ring 120b is of two-part construction. That is, the first seal support ring 120b comprises an inner portion 124b constructed of a metal such as steel and an elastomeric outer portion 126b having a plurality of longitudinal grooves 132b for transmitting fluid pressure in the trapped fluid chamber 46b to the rear side 130b of the first seal support ring 120b. An annular projection 188 is formed on the inner portion 124b at the rear side 130b of the first seal support ring 120b adjacent the first passage 26b and the projection 188 extends into the shoulder 182 formed in the pocket wall 60b. The normal tolerances between the outer periphery 190 of the projection 188 and the periphery 184 of the shoulder 182 provide sufficient clearance for venting fluid pressure in the trapped fluid chamber 46b to the first biasing ring 150b.

The first biasing ring 150b differs from the first biasing ring 150 and the first biasing ring 150a in two significant respects. Since fluid pressure from the trapped fluid chamber 46b is transmitted to a side of the first biasing ring 150b engaging the first seal support ring 120b rather than a side engaging the body 22b of the valve wherein the seal assembly 36b is disposed, it is convenient for the free end 158b of the first biasing ring 150b to be the end thereof engaging the annular projection 188 formed on the rear side 130b of the first seal support ring 120b as has been indicated in FIG. 9. That is, it is convenient for the fixed end 154b of the first biasing ring 150b, opposite the free end 158b to be bonded to the annular face 186 of the shoulder 182 formed in the first seal pocket 32b rather than to the seal support ring 120b. However, no limitation to such choice is required. The first biasing ring 150b can be bonded to the first seal support ring 120b as in the case of the previously described seal assemblies 36, 36a. The first biasing ring 150b differs from the biasing rings 150 and 150a in that no ear such as the ears 156 and 156a are required for the first biasing ring 150b. Rather, the ends 154b and 158b of the first biasing ring 150b have the configuration of planar annuli.

Figure 10:
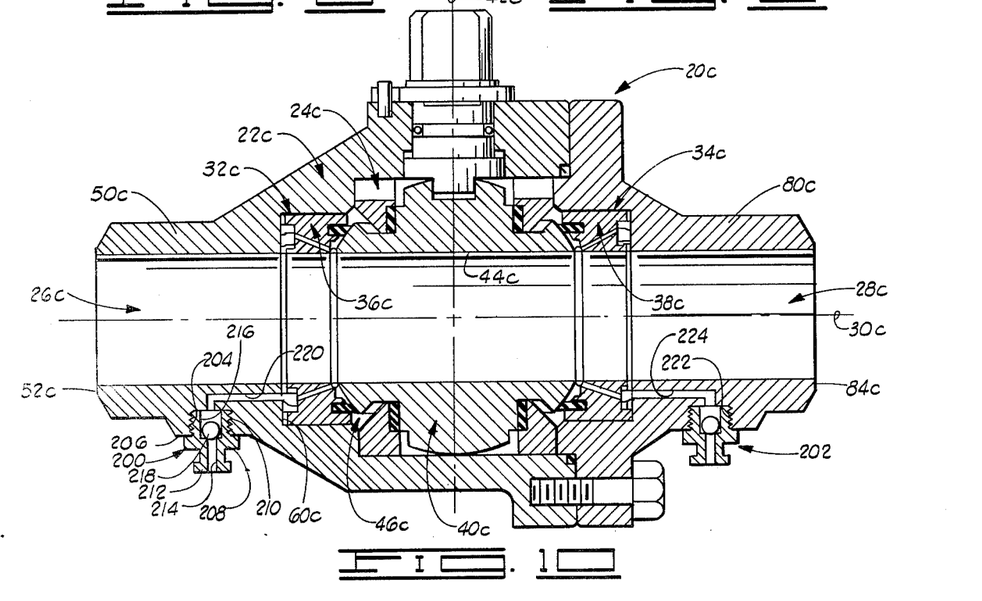
FIG. 10 is a cross-sectional view in side elevation of a modification of the valve of the present invention to include means for injecting a sealant between the seal assemblies and the valve member.

Referring now to FIG. 10, shown therein and designated by the general reference numeral 20c is a second embodiment of a valve constructed in accordance with the present invention. The valve 20c generally comprises: a body 22c, differing as will be described below from the body 22 of the valve 20; first and second seal assemblies 36c and 38c, similarly differing from the above-described seal assemblies as will be described below; and a valve member 40c identical to the valve member 40 of the valve 20 and supported in the valve chamber 24c of the valve 20c in the same manner that the valve member 40 is supported in the valve chamber 24 of the valve 20.

The valve 20c differs from the valve 20 in that provision is made in the valve 20c for introducing a viscous lubricant, commonly referred to in the art as a sealant, between portions of the seal assemblies 36c, 38c adjacent the passages 26c, 28c and the surface of the valve member 40c. In particular, the valve body 22c comprises a first sealant port 200 near the first end 52c of the first portion 50c of the valve body 22c and a second sealant port 202 near the second end 84c of the second portion 80c. For the purpose of mounting the first sealant port 200, an internally threaded concavity 204 is formed in the exterior surface 206 of the first portion 50c of the body 22c. The first sealant port 200 comprises a plug 208 having a threaded portion 210 at one end and a nipple 212 at the opposite end. The threaded portion 210 of the plug 208 screws into the concavity 204 to mount the first port 200 in the body 22c in the usual manner. A bore 214 is formed through the plug 208 and a portion 216 of the bore 214 within the threaded portion 210 of the plug 208 is formed on an enlarged diameter. A ball 218 is disposed in the enlarged portion 216 of the bore 214 to permit injection of sealant into the body 22c within permitting leakage via the first port 200. A sealant passage 220 is formed in the body 22c, intersecting the concavity 204 to receive sealant from the port 200, and the sealant passage 200 extends to the first pocket wall 60c and opens thereinto radially inwardly of the outer periphery 144c of the shoulder 142c formed in the rear side 130c of the first seal support ring 120c. (See FIGS. 12 and 13). A concavity 222, similar to the concavity 204, is formed in the second portion 80c of the body 22c near the second end 84c thereof and the second port 202, identical to the first port 200, is similarly screwed into the concavity 222. A sealant passage 224 provides fluid communication between the second port 202 and the second seal pocket 34c in the same manner that the sealant passage 220 provides fluid communication between the first port 200 and the first seal pocket 32c.

Figure 11:
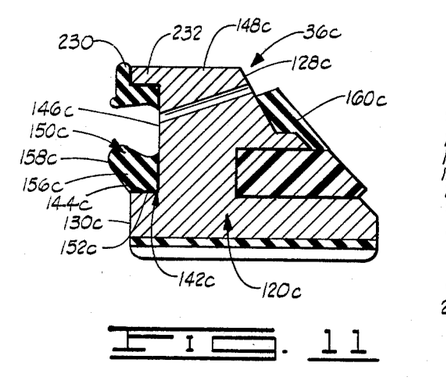
FIG. 11 is an enlarged typical cross-sectional view through a seal assembly used in the valve of FIG. 10.
Figure 12:
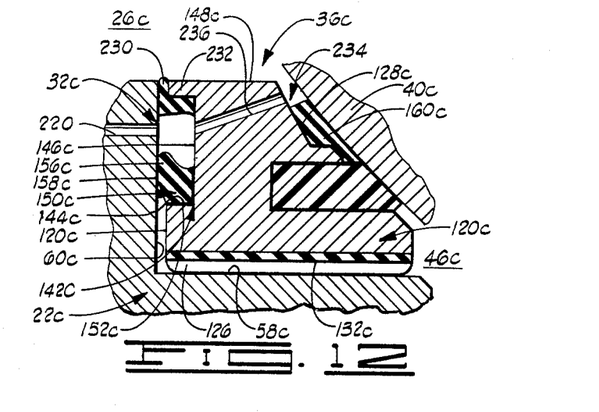
FIG. 12 is an enlarged typical cross-sectional view through the seal assembly of FIG. 11 showing the configuration of the seal assembly when installed in the valve of FIG. 10.
Figure 13:
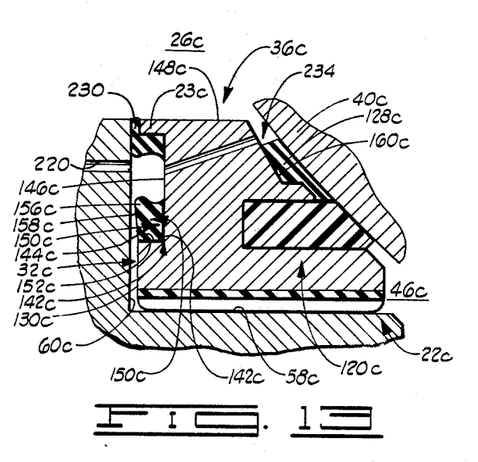
FIG. 13 is a cross-sectional view similar to FIG. 12 showing the manner in which the seal assembly vents excess pressure from isolated portions of the valve chamber of the valve of FIG. 10.

One preferred form of the first seal assembly, designated 36c, suitable for use in the body 22c has been shown in FIGS. 11 through 13 with FIGS. 12 and 13 showing configurations of the first seal assembly 36c, when mounted in the first seal pocket 32c, for differing conditions of operation of the valve 20c. The second seal assembly 38c can be identical to the first seal assembly 36c and will not be described herein.

The first seal assembly 36c differs from the first seal assembly 36 as will now be described. The first biasing ring 150c is radially narrowed so that, when the outer periphery 152c thereof is bonded to the outer periphery 144c of the annular shoulder 142c formed in the rear side 130c of the first seal support ring 120c, the first biasing ring 150c is displaced radially outwardly from the inner periphery 148c of the first seal support ring 120c. In particular, the ear 156c of the first biasing ring 150c is positioned to engage the pocket wall 60c of the seal pocket 32 radially outwardly of the opening of the sealant passage 220 into the first seal pocket 32c as has been shown in FIGS. 12 and 13. That is, a sealant injected into the body 22c via the first sealant port 200 will be transmitted into the shoulder 142c formed on the rear side 130c of the first seal support ring 120c between the inner periphery 148c thereof and the first biasing ring 150c. In order to block direct transmittal of such sealant to the first passage 26c of the body 22c, a first auxiliary sealing ring 230 is bonded to the radial wall 146c of the shoulder 142c formed in the rear side 130c of the first seal support ring 120c, the first auxiliary sealing ring 230 engaging the pocket wall 60c and extending circumferentially about the first passage 26c between the first passage 26c and the opening of the sealant passage 220 into the first seal pocket 32c. Thus, the pocket wall 60c, the radial wall 146c, the first biasing ring 150c and the first auxiliary sealing ring 230 form an annular sealant cavity adjacent the pocket wall 60c for receiving sealant injected via the sealant port 200. An annular lip 232 can be formed on the radial wall 146c adjacent the inner periphery 148c of the first seal support ring 120c to support the first auxiliary sealing ring 230 against the pocket wall 60c.

The first sealing ring 160c is similarly displaced radially outwardly from the inner periphery 148c of the first seal support ring 120c so that, as shown in FIGS. 12 and 13, the forward side 128c of the first seal support ring 120c, the first sealing ring 160c and the surface of the valve member 40c form a first sealant channel 234 between portions of the forward side 128c of the first seal support ring 120c disposed adjacent the inner periphery 148c thereof and the valve member 40c, the first sealant channel 234 extending circumferentially about the first passage 26c at the forward side 128c of the first seal support ring 120c. A plurality of sealant passages 236 are formed through the first seal support 120c between the first sealant channel 234 and the radial wall 146c of the shoulder 142c formed in the rear side 130c of the first seal support ring 120c, the sealant passages 236 intersecting the wall 146c between the first biasing ring 150c and the first auxiliary sealing ring 230 to communicate with the sealant passage 220 formed in the body 22c such that sealant injected into the first sealant port 200 is transmitted via the sealant passages 220, 236 to the first sealant channel 234. A second sealant channel (not shown) is formed between portions of the second seal support ring of the second seal assembly 38c and similarly receives sealant via the second sealant port 202.

Fluid pressure in the trapped fluid chamber 46c is transmitted to the rear side 130c of the first seal support ring 120c via the grooves 132c in the elastomeric outer portion 126c of the first seal support ring 120c as in the case of the seal assemblies 36 and 38. Fluid pressure in the first passage 26c is transmitted to the inner periphery of the first biasing ring 150c via the first sealant channel 234 and the sealant passages 236 so that, as in the previously described embodiments of the present invention, the pressure differential between the traped fluid chamber 46c and the first passage 26c is applied radially across the ear 156c of the first biasing ring 150c. Since the outer periphery 152c of the first biasing ring 150c is supported by the outer periphery 144c of the shoulder 142c formed in the rear side 130c of the first seal support ring 120c while the inner periphery of the first biasing ring 150 is unsupported, the first biasing ring 150c provides a unidirectional seal between the first passage 26c and the trapped fluid chamber 46c. In particular, when the fluid pressure in the first passage 26c exceeds the fluid pressure in the trapped fluid chamber 46c, the pressure differential across the ear 156c of the first biasing ring 150c forces the free end 158c of the first biasing ring 150c against the pocket wall 60c of the first seal pocket 32c as shown in FIG. 12 to prevent the flow of fluid from the first passage 26c to the trapped fluid chamber 46c so that the valve 20c will be closed to fluid flow in the closed position of the valve member 40c. Conversely, when the fluid pressure in the trapped fluid chamber 46c exceeds the fluid pressure in the first passage 26c, the free end 158c of the first biasing ring 150c is lifted away from the pocket wall 60c, as shown in FIG. 13, to vent the excess fluid pressure in the trapped fluid chamber 46c to the first passage 26c via the spacing between the free end 158c of the first biasing ring 150c and the pocket wall 60c and via the sealant passages 236 formed through the first seal support ring 120c and the first sealant channel 234.

In order that sealant introduced into the first sealant channel 234 be evenly distributed therein; that is, in order to prevent excessive flow of sealant from the first sealant channel 234 to the first passage 26 at positions along the inner periphery 148c of the first seal support ring 120c aligned with the sealant passages 236, the opening of the first sealant channel 234 to the first passage 26c is restricted by the shaping of the forward side 128c of the first seal support ring 120c. In particular, portions of the forward side 128c of the first seal support ring 120c are shaped to conform to a frustoconical surface converging toward the surface of the valve member 40c near the first passage 26c in the assembled valve 20c.

Figure 14:
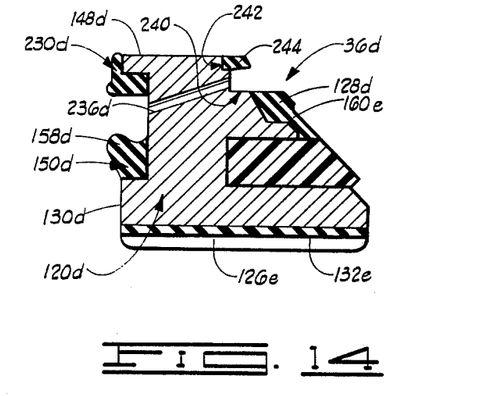
FIG. 14 is a typical cross-sectional view of a modification of the seal assembly of FIG. 11.
Figure 15:
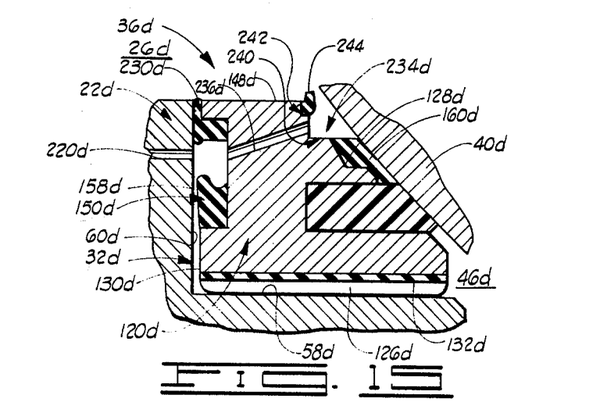
FIG. 15 is an enlarged typical cross-sectional view through a seal assembly constructed as in FIG. 14 showing the manner in which the seal assembly vents excess pressure from isolated portions of the valve chamber of the valve of FIG. 10.

FIGS. 14 and 15 show another construction of a first sealing assembly, designated 36d, constructed to restrict the opening of the first sealant channel, designated 234d, to the first passage 26c of a valve body 22d identical to the valve body 22c and containing a valve member 40d identical to the valve member 40c. An annular shoulder 240 is formed in the forward face 128d of the first seal support ring 120d and extends circumferentially about the first passage 26d of the body 22d. The shoulder 240 intersects the sealant passages 236d and opens toward the first passage 26d so that the first sealant channel 234d formed thereby with the valve member 40d and the first sealing ring 160d similarly opens into the first passage 26d. A secondary shoulder 242 is formed in portions of the shoulder 240 adjacent the inner periphery 148d of the first seal support ring 120d and extends circumferentially thereabout in a facing relation with the valve member 40d. An annular flap 244 constructed of an elastomeric material such as rubber, is bonded to the first seal support ring 120d, a portion of the annular flap 244 mating with the secondary shoulder 242 and bonded thereto and a portion of the flap 244 extending axially toward the valve member 40d to restrict the opening of the first sealant channel 234d to the first passage 26d. The relief of excess fluid pressure in the trapped fluid chamber 46d by the seal assembly 36d has been shown in FIG. 15. As shown therein, excess fluid pressure in the trapped fluid chamber 46d is transmitted to the first biasing ring 150d via the grooves 132d in the elastomeric outer portion 126d of the first seal support ring 120d and lifts the free end 158d of the first biasing ring 150d away from the pocket wall 60d of the first seal pocket 32d in the manner described for the seal assembly 36c so that the excess fluid pressure is transmitted to portions of the flap 244 extending from the seal support ring 120d and toward the valve member 40d. Such portions of the flap 244 flex radially inwardly, as shown in FIG. 15, to vent the excess pressure in the trapped fluid chamber 46d to the first passage 26d. The second seal assembly for a valve incorporating the first seal assembly 36d can be constructed identically to the first seal assembly 36d or can be a seal assembly constructed in the manner of the first seal assembly 36c.

It is clear that the present invention is well adapted to carry out the objects and obtain the ends and advantages mentioned as well as those inherent therein. While preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A valve, comprising:
   a body having formed therein a first passage and a second passage to provide inlet and outlet passages for the valve, and having formed therein a valve chamber interposed between the first passage and the second passage;
   a valve member supported in the valve chamber for rotation between open and closed positions, the valve member having means communicating the first passage with the second passage in the open position thereof; and
   seal means for isolating portions of the valve chamber about the valve member from the first passage and the second passage, whereby the valve is opened and closed via positioning of the valve member and whereby portions of the valve chamber about the valve member from a trapped fluid chamber thereabout, the seal means comprising:
      a first seal assembly extending about the first passage and engaging the valve member, comprising:
         a first seal support ring having a forward side facing the valve member and a rear side facing away from the valve member, wherein the first seal support ring is characterized as having means communicating fluid pressure in the trapped fluid chamber to the rear side of the first seal support ring;
         a first sealing ring attached to the forward side of the first seal support member for sealingly engaging the valve member;
         first biasing ring means extending about the first passage adjacent the rear side of the first seal support ring for venting fluid pressure at the rear side of the first seal support ring in excess of fluid pressure in the first passage to the first passage; and
      a second seal assembly extending about the second passage and engaging the valve member.

2. The valve of claim 1 wherein the body is characterized as having formed therein adjacent the valve chamber a first seal pocket containing the first seal support ring, the first seal pocket defined by a cylindrical pocket periphery extending circumaxially about the first passage and extending axially to the trapped fluid chamber and by a pocket wall facing the valve member and extending from the pocket periphery to the first passage; wherein the first seal support ring is characterized as having an outer periphery non-sealingly engaging the pocket periphery; and wherein fluid pressure in the trapped fluid chamber is transmitted along the pocket periphery and the pocket wall about the first seal support ring to the first biasing ring means.

3. The valve of claim 2 wherein the first seal support ring comprises:
   an inner portion of a relatively rigid material; and
   an outer portion of an elastomeric material, wherein a plurality of grooves are formed in the outer periphery of the outer portion and extend from the forward side of the first seal support ring to the rear side thereof.

4. The valve of claim 3 or claim 9 wherein the pocket wall has the form of a planar annulus; wherein an annular shoulder is formed in the rear side of the first seal support ring, said shoulder defined by an outer periphery extending circumaxially about the first passage and a radial wall intersecting said outer periphery of said shoulder and extending therefrom toward the first passage; and wherein the first biasing ring is characterized as being an elastomeric ring extending about the first passage, the first biasing ring means bonded to the outer periphery and the radial wall of said shoulder and having an annular lip portion extending from said shoulder to engage the pocket wall of the first seal pocket, said lip portion dimensioned so as to be placed in an axially stressed state via the engagement with the pocket wall when the first sealing ring engages the valve member, whereby the first biasing ring means urges the first seal support ring toward the valve member and whereby fluid pressure transmitted from the trapped fluid chamber to the first biasing ring means is relieved via further stressing of the lip portion so as to permit venting of fluid in the trapped fluid chamber between the pocket wall and the lip portion of the first biasing ring means.

5. The valve of claim 2 wherein the pocket wall has the form of a planar annulus; wherein an annular shoulder is formed in the rear side of the first seal support ring, said shoulder defined by an outer periphery extending circumaxially about the first passage and a radial wall intersecting said outer peiphery of said shoulder and extending therefrom toward the first passage; and wherein the first biasing ring means is characterized as being an elastomeric ring extending about the first passage, the first biasing ring means bonded to the outer periphery and radial wall of said shoulder and having a lip portion extending from said shoulder to engage the pocket wall of the first seal pocket, said lip portion dimensioned so as to be placed in an axially stressed state via the engagement with the pocket wall when the first sealing ring engages the valve member, whereby the first ring biasing means urges the first seal support ring toward the valve member and whereby fluid pressure transmitted from the trapped fluid chamber along the pocket wall is relieved via further stressing of the lip portion so as to permit venting of fluid pressure in the trapped fluid chamber between the pocket wall and the lip portion of the first biasing ring means.

6. The valve of claim 5 wherein the first sealing ring is radially displaced from the first passage such that the forward face of the first seal support ring, the surface of the valve member, and the first sealing ring define an annular first sealant channel opening into the first passage and extending thereabout; wherein the valve body is characterized as having a first sealant port formed in the outer periphery thereof for introducing sealant into the valve body, said sealant port communicating with the first seal pocket via a sealant passage formed through a portion of the body and said sealant passage opening into a portion of the pocket wall of the first seal pocket disposed radially inwardly of the first biasing means; wherein the first seal assembly further comprises a first auxiliary sealing ring bonded to the radial wall of the shoulder on the rear side of the first seal support ring, the first auxiliary sealing ring engaging the pocket wall of the first seal pocket and extending about the first passage between the first passage and the opening of the sealant passage in the body into the first seal pocket, whereby the pocket wall, the radial wall of the shoulder on the rear side of the first seal support ring, the first biasing ring and the first auxiliary sealing ring coact to form an annular sealant cavity adjacent the pocket wall and communicating with the first sealant port; and wherein a plurality of sealant passages are formed through the first seal support ring between said annular sealant cavity and said first sealant channel.

7. The valve of claim 6 wherein portions of the forward side of the first seal support ring adjacent the first passage are disposed along a frusto-conical surface converging toward the valve member near the opening of the first sealant channel into a first passage for restricting said opening into the first passage.

8. The valve of claim 6 wherein the first seal assembly further comprises a first annular flap of an elastomeric material bonded to the forward side of the first seal support ring adjacent to first passage, the first annular flap extending axially toward the valve member to restrict the opening of the first sealant channel into the first passage.

9. The valve of claim 1 wherein a plurality of vent passages are formed through the first seal support ring, the vent passages extending from portions of the forward side of the first seal support ring in fluid communication with the trapped fluid chamber to portions of the rear side of the first seal support ring disposed radially outwardly of the first biasing means, said vent passages transmitting fluid pressure in the trapped fluid chamber to the rear side of the first seal support ring.

10. The valve of claim 2, 3, 9 or 5 wherein the first biasing ring means is formed unitarily with the first sealing ring.

11. The valve of claim 2, 3, 9 or 5 wherein the first sealing ring is formed of a relatively flexible organic polymer; wherein an annular first thrust ring groove is formed in the forward side of the first seal support ring, said first thrust ring groove extending about the first sealing ring; and wherein the first seal assembly further comprises a thrust ring of a relatively inflexible organic polymer mounted in the first thrust ring groove and extending therefrom to engage the valve member for limiting axial thrust forces between the first sealing ring and the valve member.

12. The valve of claim 2 wherein an annular shoulder is formed in the pocket wall of the first seal pocket said shoulder defined by a cylindrical outer periphery concentric with the pocket periphery and an annular face extending from said outer periphery of said shoulder to the first passage; wherein a portion of the first seal support ring defining a portion of the rear side thereof extends into the shoulder formed in the pocket wall of the first seal pocket, said portion of the first seal support ring having an outer periphery nonsealingly engaging the outer periphery of the shoulder formed in the pocket wall of the first seal pocket; and wherein the first biasing means is characterized as being an elastomeric ring bonded to one of the annular face of the shoulder formed in the pocket wall of the first seal pocket and the rear side of the first seal support ring and engaging the other of the annular face of the shoulder formed in the pocket wall of the first seal pocket and the rear side of the first seal support ring, the axial width of the first biasing means selected such that the first biasing means is compressed between the body and the first seal support ring when the first sealing ring engages the valve member.

13. The valve of claim 12 wherein the first sealing ring is formed of a relatively flexible organic polymer, wherein an annular first thrust ring groove is formed in the forward side of the first seal support ring, said first thrust ring groove extending about the first sealing ring; and wherein the first seal assembly further comprises a thrust ring of a relatively inflexible organic polymer mounted in the first thrust ring groove and extending therefrom to engage the valve member for limiting axial thrust forces between the first sealing ring and the valve member.

14. The valve of claim 1 wherein the second seal assembly comprises:
a second seal support ring having a forward side facing the valve member and a rear side facing away from the valve member, wherein the second seal support ring is characterized as having means communicating fluid pressure in the trapped fluid chamber to the rear side of the second seal support ring;
a second sealing ring attached to the forward side of the second seal support ring for sealingly engaging the valve member; and second biasing ring means extending about the second passage adjacent the rear side of the second seal support ring for venting fluid pressure at the rear side of the second seal support ring in excess of fluid pressure in the second passage to the second passage.

15. An improved seal assembly for a valve of the type having a rotatable valve member disposed in a valve chamber of a body of the valve between first and second passages intersecting the valve chamber and extending therefrom to form inlet and outlet passages for the valve and having seal assemblies about each passage to cooperate with the valve member and adjacent walls of the body to close the flow passageway in a closed position of the valve member, whereby portions of the valve chamber between the seal assemblies are isolated from the first and second passage to form a trapped fluid chamber about the valve member, comprising:
a seal support ring having a forward side facing the valve member and a rear side facing away from the valve member, the seal support ring characterized as having means communicating fluid pressure in the trapped fluid chamber to the rear side of the seal support ring;
means on the forward side of the seal support ring for forming a seal between the seal support ring and the valve member; and
means on the rear side of the seal support ring for relieving excess pressure in the trapped fluid chamber, said means comprising an elastomeric ring extending about the passage encircled by the seal assembly, said elastomeric ring having an inner periphery exposed to fluid pressure in said passage and said elastomeric ring having an outer periphery exposed to fluid pressure in the trapped fluid chamber, said elastomeric ring being bonded to one of the seal support ring and the body of the valve and extending therefrom to the other of the seal support ring and the body of the valve, wherein the one of the seal support ring and body of the valve to which said elastomeric ring is bonded includes means supporting the outer periphery of said elastomeric ring, whereby said elastomeric ring forms a unidirectional seal between the passage encircled thereby and the trapped fluid chamber, said elastomeric ring disengaging said other of the seal support ring and the body of the valve engaged thereby in response to an excess fluid pressure in the trapped fluid chamber to permit venting of said excess pressure to the passage encircled by said elastomeric ring.

16. A valve comprising:
a body having formed therein a first passage and a second passage to provide inlet and outlet passages for the valve, and having formed therein a valve chamber interposed between the first passage and the second passage;
a valve member supported in the valve chamber for rotation between open and closed positions, the valve member having means communicating the first passage with the second passage in the open position thereof; and
a seal assembly extending about the first passage comprising:
a first seal support ring having an annular first thrust ring groove formed in a forward side thereof facing the valve member;
means for urging the first seal support ring toward the valve member and for forming a fluid seal between the first seal support ring and the body, said fluid seal extending about the first passage;
a first sealing ring of a relatively flexible organic polymer attached to the forward side of the first seal support ring and engaging the valve member to form a fluid seal between the first seal support ring and the valve member, said fluid seal extending about the first passage and a portion of the valve member extending across said fluid seal in the closed position thereof, whereby the first seal assembly cooperates with the body and with the valve member to close the flow passageway in the closed position of the valve member; and
a first thrust ring of a relatively inflexible organic polymer mounted in the first thrust ring groove and protruding therefrom to engage the valve member for limiting axial thrust exerted on the first sealing ring by the valve member.

17. The valve of claim 16 wherein portions of the valve member engaged by the first seal assembly in the closed position of the valve member are shaped to conform to a portion of a sphere; wherein the valve member comprises:
a circular first trunnion adjacent the wall of the valve chamber; and
a circular second trunnion coaxial with the first trunnion, the second trunnion positioned adjacent portions of the wall of the valve chamber opposite portions thereof adjacent the first trunnion;
wherein the valve further comprises:
a first trunnion bushing of a heat destructible material mounted on the first trunnion and extending thereabout;
a second trunnion bushing of a heat destructible material mounted on the second trunnion and extending thereabout;
means for supporting the first and second trunnion bushings on the valve body about a trunnion axis transverse to the first passage, whereby the valve member is supported for rotation about the trunnion axis in a normal operating mode of the valve; and an operating stem rotatably mounted in the valve body about the trunnion axis and engaging the first trunnion for rotating the valve member, the operating stem engaging the first trunnion along a line parallel to the first passage when the valve member is in the closed position, whereby the valve member is axially displaceable toward the first passage in the event the first and second bushings are destroyed by fire and when a greater fluid pressure exists in the second passage than in the first passage; and wherein an inner portion of the first seal support ring is constructed of metal; wherein said inner portion of the first seal support ring is characterized as having formed on the forward face thereof an annular lip adjacent the inner periphery of the first thrust ring and having an annular surface on the distal end thereof shaped to conform to a portion of a spherical surface having a radius equal to the radius of the spherical portion of the valve member, said surface on the distal end of the annular lip spaced a preselected distance less than the radical thickness of the first and second bushings from the surface of the valve member, whereby the valve member will displace toward the first passage to engage said annular lip and close the passageway in response to a higher fluid pressure in the second passage than in the first passage in the event the first sealing ring, the first thrust ring and the first and second bushings are destroyed by fire.

18. The valve of claim 17 wherein a second annular surface shaped to conform to a spherical surface having a radius equal to the radius of the spherical portion of the valve member is formed on the forward side of said inner portion of the seal support ring, said second annular surface being adjacent to the outer periphery of the thrust ring and extending thereabout and said second annular surface being axially spaced from the surface of the valve member a distance less than the radial thickness of the first and second bushings and greater than the axial spacing btween the valve member and the annular surface formed on the distal end of the annular lip adjacent the inner periphery of the thrust ring; and wherein portions of said inner portion of the first seal support ring whereon the second annular surface is formed is characterized as having a greater radial thickness than the radial thickness of said annular lip.

19. A valve according to claim 1 wherein the body has a first sealant port mounted in the outer periphery thereof for introduction of sealant in the body; wherein the first sealing ring is radially displaced a preselected distance from the first passage, whereby the first seal support ring, the valve member and the first sealing ring coact to form a first sealant channel adjacent the forward side of the first seal support ring, the first sealant channel extending about the first passage and having an annular opening thereinto between portions of the first seal support ring and the valve member; wherein a plurality of sealant passages are formed through the first seal support ring and intersect the first sealant channel; wherein a sealant passage communicating with the sealant passages in the first seal support ring is formed through the body and communicates with the first sealant port, whereby sealant can be injected into the first sealant channel via the first sealant port and the sealant passages formed in the first seal support ring and the body; and wherein the first seal support ring is characterized as comprising means restricting the opening of the first sealant channel into the first passage.

20. The valve of claim 19 wherein portions of the forward side of the first seal support ring adjacent the first passage are disposed along a frusto-conical surface converging toward the valve member near the opening of the first sealant channel into the first passage for restricting said opening into the first passage.

21. The valve of claim 19 wherein the seal means includes an annular flap of an elastomeric material bonded to the forward side of the first seal support ring adjacent the first passage, the annular flap extending axially toward the valve member to restrict the opening of the first sealant channel into the first passage.

* * * * *

UNITED STATES PATENT AND TRADEMARK OFFICE
CERTIFICATE OF CORRECTION

PATENT NO. : 4,254,793

DATED : March 10, 1981

INVENTOR(S) : Domer Scaramucci

It is certified that error appears in the above-identified patent and that said Letters Patent is hereby corrected as shown below:

Column 11, line 23, "36" should read -- 136 --.

Column 13, line 33, "within" should resd -- without --.

Column 16, line 34, "from" should read -- form --.

Column 18, line 26, "to" should read -- the --.

Signed and Sealed this

Fifth Day of July 1983

[SEAL]

Attest:

GERALD J. MOSSINGHOFF

Attesting Officer     Commissioner of Patents and Trademarks